(12) United States Patent
Falk et al.

(10) Patent No.: US 8,531,803 B2
(45) Date of Patent: Sep. 10, 2013

(54) LIGHTNING PROTECTION FOR POWER INVERTERS

(75) Inventors: Andreas Falk, Kassel (DE); Gerold Schulze, Kassel (DE)

(73) Assignee: SMA Solar Technology AG, Niestetal (DE)

( * ) Notice: Subject to any disclaimer, the term of this patent is extended or adjusted under 35 U.S.C. 154(b) by 125 days.

(21) Appl. No.: 13/029,585

(22) Filed: Feb. 17, 2011

(65) Prior Publication Data

US 2011/0197946 A1 Aug. 18, 2011

(30) Foreign Application Priority Data

Feb. 18, 2010 (EP) ...................................... 10153992

(51) Int. Cl.
*H02H 3/00* (2006.01)
*H02H 9/08* (2006.01)

(52) U.S. Cl.
USPC .................................. 361/42; 361/44; 361/45

(58) Field of Classification Search
USPC ........................................................ 361/42
See application file for complete search history.

(56) References Cited

U.S. PATENT DOCUMENTS

| | | | | |
|---|---|---|---|---|
| 6,122,157 A * | 9/2000 | Gerlach | ......................... | 361/124 |
| 6,504,692 B1 * | 1/2003 | Macbeth et al. | ................ | 361/42 |
| 7,239,491 B1 * | 7/2007 | Morgan et al. | .................. | 361/42 |
| 8,053,930 B2 * | 11/2011 | Cramer et al. | .................. | 307/82 |
| 2003/0099073 A1 * | 5/2003 | Anamura et al. | ............... | 361/42 |

FOREIGN PATENT DOCUMENTS

| | | |
|---|---|---|
| JP | 2004236413 A | 8/2004 |
| KR | 1020080097861 A | 6/2008 |

OTHER PUBLICATIONS

Hernandez, et al., "Lightning and Surge Protection in Photovoltaic Installations", IEEE Transactions on Power Delivery, vol. 33, No. 4, Oct. 2005, p. 1961-1971.

* cited by examiner

*Primary Examiner* — Dharti Patel
(74) *Attorney, Agent, or Firm* — Eschweiler & Associates, LLC

(57) ABSTRACT

An inverter includes two input lines for connecting the inverter to an AC power source, a buffer capacitance effective between the input lines, a grounded potential equalization busbar, an isolation monitoring device monitoring the electrical isolation of one of the two input lines with regard to the potential equalization busbar, and an overvoltage eliminating device having at least one overvoltage eliminator for draining overvoltages from the input lines to the potential equalization busbar. The at least one overvoltage eliminator is connected between that input line, whose electric isolation with regard to the potential equalization busbar is monitored, and the potential equalization busbar, without any fuse being connected in series with the at least one overvoltage eliminator. Any overvoltage eliminator of the overvoltage eliminating device, which is connected between the other of the two input lines and the potential equalization busbar, if present, is connected in series with a fuse.

21 Claims, 4 Drawing Sheets

LIGHTNING PROTECTION FOR POWER INVERTERS

TECHNICAL FIELD

The invention relates to overvoltage protection, and, more particular, to lightning protection for power inverters. More particular, the invention relates to overvoltage protection for an inverter comprising two input lines for connecting the inverter to an DC power source; a buffer capacitance effective between the input lines; a potential equalization busbar adapted to be connected to at least one grounding device; an isolation monitoring device monitoring the electrical isolation of at least one of the two input lines with regard to the potential equalization busbar; and an overvoltage eliminating device for draining overvoltages from the input lines to the potential equalization busbar, the overvoltage eliminating device having at least one overvoltage eliminator. Further, the invention relates to a solar plant comprising such an inverter. The inverter may, however, also be used in combination with other DC current or DC voltage sources.

BACKGROUND ART

Problems due to overvoltages generated by lightnings particularly occur in such inverters to which DC current or DC voltage sources are connected which are exposed to the weather and which are thus prone to an increased danger of lightnings coupling-in. Besides photovoltaic generators this also applies to wind generators.

In an inverter described by HERNANDEZ J C ET AL: "Lightning and Surge Protection in Photovoltaic Installations" IEEE TRANSACTIONS ON POWER DELIVERY, IEEE SERVICE CENTER, NEW YORK, N.Y., US LNKD-DOI: 10.1109/TPWRD.2008.917886, Vol. 23, No. 4, Oct. 1, 2008 (2008 Oct. 1), pages 1961-1971, XP011225303ISSN: 0885-8977, each of two input lines of the inverter is connected to a grounded potential equalization busbar of the inverter via a varistor serving as a overvoltage eliminator. One of the two input lines may additionally be connected to the potential equalization busbar via a GFDI, i.e. a Ground Fault Detector and Interrupter, to apply ground potential to this input line, but to interrupt this ground connection automatically in case of a ground fault. If an overvoltage is coupled in the input lines of this known inverter by lightning, for example, it flows via the varistors to the potential equalization busbar and from there towards ground. So far as the varistors are not overloaded, they will again become high-ohmic, i.e. non-conductive after elimination of the overvoltage. If they are, however, overloaded, the varistors become permanently low-ohmic, i.e. conductive. If the varistors between both input lines and the potential equalization busbar are overloaded, this means an undesired short-circuit between the two input lines and thus of the DC power source connected to the input lines. Additionally, there is a considerable probability that this short-circuit does not result in the GFDI tripping, as it does not notice a ground fault due to the varistor connected in parallel which also became low-ohmic. Because of this probability, it is known to connect each of the two varistors in series with a fuse, which, however, means additional effort and related cost. Whereas varistors rarely include devices for fault signalling, this is regularly the case with GFDIs. Thus, tripping of a GFDI can easily be noticed and signalled as an indication of a fault of the inverter.

In another known inverter, two varistors are connected in series between its two input lines. An intermediate point between the two varistors is connected to a potential equalization busbar of this known inverter via an overvoltage eliminator which is based on a spark gap. The two varistors connected in series also allow for a compensation of overvoltages between the two input lines. Currents drained for overvoltage elimination towards the grounded potential equalization busbar flow across the spark gap which is turned off by the varistors becoming high-ohmic again after elimination of the overvoltage. If, however, one varistor becomes permanently low-ohmic due to an overload, turning the spark gap off is no longer ensured, and with overloading both varistors a permanent short circuit between the input lines arises.

For the purpose of lightning protection for inverters it is also known to provide lightning catching rods above a housing of the inverter, which are connected to a grounding device. The lightning catching rods are high voltage-isolated with regard to the housing of the inverter, and electric lines from the lightning catching rods to the grounding device also comprise a high voltage-isolation. Due to this high voltage-isolation, the characteristic wave resistance of this line for currents induced by a lightning is reduced so that these currents may drain to ground quickly without coupling into the inverter housing. However, a considerable danger exists that the ground currents flowing from the grounding device as a result of a lightning nevertheless couple into the inverter via the grounding of the potential equalization busbar of the inverter, as the ground currents may only flow off via a large ground area due to the high ground impedance.

There is a need for a power inverter and a solar plant including such a power inverter, which provide for an enhanced lightning protection at reduced cost.

SUMMARY

The following presents a simplified summary in order to provide a basic understanding of one or more aspects of the invention. This summary is not an extensive overview of the invention, and is neither intended to identify key or critical elements of the invention, nor to delineate the scope thereof. Rather, the primary purpose of the summary is to present some concepts of the invention in a simplified form as a prelude to the more detailed description that is presented later.

The present invention relates to an inverter comprising two input lines for connecting the inverter to a DC power source, a buffer capacitance effective between the input lines, a potential equalization busbar adapted to be connected to at least one grounding device. The inverter further comprises an isolation monitoring device monitoring the electrical isolation of at least one of the two input lines with regard to the potential equalization busbar, and an overvoltage eliminating device for draining overvoltages from the input lines to the potential equalization busbar. The overvoltage eliminating device comprises at least one overvoltage eliminator, wherein the at least one overvoltage eliminator of the overvoltage eliminating device is connected between the at least one input line, whose electric isolation with regard to the potential equalization busbar is monitored by the isolation monitoring device, and the potential equalization busbar, without any fuse being connected in series with the at least one overvoltage eliminator. In addition, any overvoltage eliminator of the overvoltage eliminating device, which is connected between the other of the two input lines and the potential equalization busbar, if present, is connected in series with a fuse.

Further, the present invention relates to a solar plant including a plurality of photovoltaic generators generating DC current, at least one inverter, and at least one collecting device remote from the inverter, which collects DC current from at least some of the plurality of photovoltaic generators and forwards it to the input lines of the inverter. The inverter of the solar plant comprises two input lines for receiving DC current from the plurality of photovoltaic generators, a buffer capacitance effective between the input lines, and a grounded first potential equalization busbar. The inverter further comprises an isolation monitoring device monitoring the electrical isolation of at least one of the two input lines with regard to the potential equalization busbar, and an overvoltage eliminating device for draining overvoltages from the input lines to the potential equalization busbar. The overvoltage eliminating device comprises at least one overvoltage eliminator, wherein the at least one overvoltage eliminator of the overvoltage eliminating device is connected between the at least one input line, whose electric isolation with regard to the potential equalization busbar is monitored by the isolation monitoring device, and the potential equalization busbar, without any fuse being connected in series with the at least one overvoltage eliminator. In addition, any overvoltage eliminator of the overvoltage eliminating device, which is connected between the other of the two input lines and the potential equalization busbar, if present, is connected in series with a fuse. The at least one collecting device remote from the inverter comprises at least one pair of collecting lines collecting DC current from at least one of the plurality of photovoltaic generators, a grounded second potential equalization busbar, and at least two varistors of a type which becomes permanently low-ohmic upon being overloaded per pair of collecting lines. The collecting device further comprises at least one fuse per pair of collecting lines, wherein both collecting lines of the at least one pair of collecting lines are connected to the second potential equalization busbar via at least one of the at least two varistors as an overvoltage eliminator, wherein one of these varistors is connected in series with the at least one fuse.

Other features and advantages of the present invention will become apparent to one with skill in the art upon examination of the following drawings and the detailed description. It is intended that all such additional features and advantages be included herein within the scope of the present invention, as defined by the claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention. In the drawings, like reference numerals designate corresponding parts throughout the several views.

DETAILED DESCRIPTION

Figure 1:
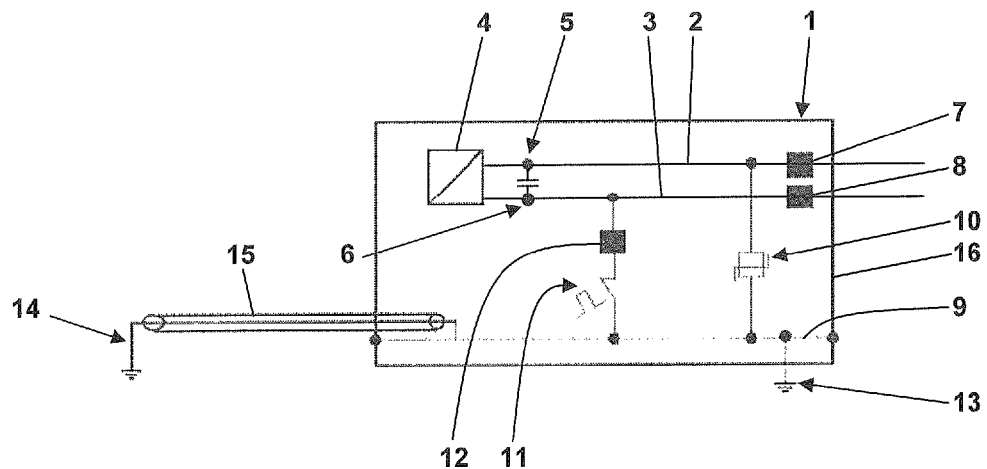
FIG. 1 illustrates a first embodiment of the new inverter.

In the following description the term "fuse" will be used to both refer to fuses in which an electric current is interrupted due to a melting lead and to fuses in which the current is interrupted in another way, like an automatic circuit breaker. Only the term "lead fuse" is a reference to a fuse with a melting lead here.

Further, the terms "the one input line" and "the one of the two input lines" refer to the at least one input line, whose electric isolation with regard to the potential equalization busbar is monitored by the isolation monitoring device. Correspondingly the terms "the other input line" and "the other of the two input line" refer to the respective other input line, whose electric isolation with regard to the potential equalization busbar is not necessarily monitored by the isolation monitoring device.

In the inverter of the present invention, the at least one overvoltage eliminator of the overvoltage eliminating device is connected between that at least one input line whose isolation with regard to the potential equalization busbar is surveyed or monitored via the isolation monitoring device and the potential equalization busbar, without any fuse being connected in series with it. Further, any overvoltage eliminator of the overvoltage eliminating device which is connected between the other input line and the potential equalization busbar, if it is present at all, is fused by a fuse connected in series. That is, between the other input line and the potential equalization busbar either no voltage eliminator of the voltage eliminating device is provided, or it is fused by a fuse connected in series.

Thus, in the invention at least one fuse may be avoided, which has up to now been connected in series with one of the overvoltage eliminators of the overvoltage eliminating device. Often, however, the new inverter will have no overvoltage eliminator of the overvoltage eliminating device connected between the other input line and the potential equalization busbar. Even then, the overvoltage elimination device is also effective with regard to overvoltages occurring between the other input line and the potential equalization busbar, which may be caused by lightning. The frequencies of such overvoltages are so high that the buffer capacitance which is effective between the input lines of the inverter provides a low AC resistance between the two input lines for currents that are provoked by these overvoltages at the same frequencies. Overvoltages at the other input line of the new inverter may thus be compensated by currents from the one input line, which flow via the buffer capacitance. Resulting overvoltages at the one input line may then be eliminated via the one overvoltage eliminator or the overvoltage eliminators of the overvoltage eliminating device arranged between the one input line and the potential equalization busbar. As a result, the overvoltage elimination device provides full overvoltage protection with a lower number of overvoltage eliminators. Particularly, it may only comprise overvoltage eliminators connected in parallel or even not more than one, i.e. a single, overvoltage eliminator which is connected between the one input line and the potential equalization busbar. Often, however, a plurality of overvoltage eliminators will be connected in parallel between the one input line and the potential equalization busbar, for example, to reduce the voltages which have to be born by each overvoltage eliminator in normal operation. This allows for the use of smaller and cheaper overvoltage eliminators.

The advantages of the new invention, however, are not limited to avoiding overvoltage eliminators without a loss in function. Instead, the functionality and the functional safety of the new inverter are even increased in that its isolation monitoring device securely responds, when the overvoltage eliminator or the overvoltage eliminators of the overvoltage eliminating device become low-ohmic. This is due to the fact that the low-ohmic resistance of the overvoltage eliminator(s)

is present between the one input line and the potential equalization busbar and thus has the same effect as a ground or isolation fault of this surveyed input line. Thus, the overvoltage elimination case is securely registered and may start any desired checking routine.

In the new inverter it is also possible to connect one or even more overvoltage eliminators between the respective other input lines and the potential rail, which are then, however, connected in series with a fuse, like for example a lead fuse or an automatic circuit breaker. This applies independently of whether only the one input line or both input lines are surveyed by the isolation monitoring device of the inverter with respect to their isolation with regard to the potential equalization busbar. With such an additional overvoltage eliminator connected in series with a fuse between the one input line and the potential equalization busbar, an additional overvoltage elimination path from the other input line to the potential equalization busbar is provided. Negative results of overloading this additional overvoltage eliminator are avoided or stopped by the series-connected fuse. Particularly, the fuse avoids also a short-circuit between the input lines via the entirety of the overvoltage eliminators of the overvoltage eliminating device and the potential equalization busbar. Even if the additional overvoltage eliminator between the other input line and the potential equalization busbar is cut off due to overloading the fuse, an essential lightning protection for the other input line is still given via the buffer capacitance according to the mechanism described above. This also applies without further measures, if the overvoltage eliminator between the one input line and the potential equalization busbar became low-ohmic, i.e. conductive due to an overload.

The isolation monitoring device may comprise a GFDI connected between the other input line and the potential equalization busbar. Tripping of the GFDI ensures that no short-circuit between the input lines via the potential equalization busbar remains, when the overvoltage eliminator(s) between the one of the input lines, to which the GFDI is not connected, and the potential equalization busbar become permanently low-ohmic. A GFDI further often comprises an integrated fault signaling device which can signal its tripping in an outward direction.

Each overvoltage eliminator of the overvoltage eliminating device of the new inverter may, in one embodiment, be a varistor, particularly a varistor of that type which, in a controlled way, becomes permanently low-ohmic upon being overloaded. Generally, each overvoltage eliminator of the overvoltage eliminating device of the inverter may, however, also be based on a spark gap. One might also connect an overvoltage eliminator in the form of a varistor in series with a spark gap based overvoltage eliminator between the one of the input lines and the potential equalization busbar.

In the inverter of the present invention, the GFDI may be connected in series with an inductor to protect it against high frequency currents. This inductor may, in one embodiment, be an air-core inductor and may be of small dimensions as the GDFI is designed for accepting small currents before it falls or trips.

The GFDI, as already indicated, may be connected to a fault signaling device of the new inverter, which signals its tripping to an external surveying unit. Additionally, the GFDI may be resettable by means of a motor, to switch it back into its conductive starting state from a remote position, for example after a lightning which coupled in but did not cause permanent damage.

A metallic housing of the inverter may also be connected to the potential equalization busbar. Not only then, but generally, it may be advantageous, if the potential equalization busbar is not only connected to the at least one grounding device but also to at least one further grounding device. To the end of connecting the potential equalization busbar to this at least one further grounding device, a high voltage-isolated connection line may be provided which has a particularly low characteristic wave resistance for lightning-induced currents and thus is a preferred path for such currents. In this way it is possible to guide such currents to ground via a further grounding device arranged remote from the inverter and remote from any DC power source connected to it. In this way, it is avoided that currents flowing to ground from this further grounding device induce overvoltages in the inverter and in any connected DC power source, so far as possible. There may also be several high voltage-isolated connection lines for connecting the potential equalization busbar to several further grounding devices, which are preferably distributed over all directions. Suitably, each of these connection lines is about 10 to 30 m long. From about 10 m, a suitable distance to the primary grounding device of the potential equalization busbar is provided so that the currents flowing from there to ground do not have an influence on the inverter anymore; and above about 30 m there is a danger that the resistance for lightning induced currents to the further grounding device becomes too high to provide a preferred flow path despite the low wave resistance of the high voltage-isolated connection line.

The high voltage-isolated line may be provided with a low-conductivity layer at an outer surface of its isolation, to avoid a glow discharge in connection areas and to ensure the low characteristic wave resistance.

Instead of the potential equalization busbar of the new inverter, it is also possible to connect at least one lightning catching rod of the new inverter to the at least one further remote grounding device via the high voltage-isolated connection line, wherein preferably no electric contact exists between the high voltage isolating connection line and the potential equalization busbar.

In a solar plant, which has at least one new inverter, the collecting lines which lead the direct current from several photovoltaic generators to the input lines of the inverter are each connected to a grounded potential equalization busbar via at least one varistor serving as an overvoltage eliminator in a current collecting device remote from the inverter. Each of these varistors is of that type which becomes permanently low-ohmic upon being overloaded, and at least one of the varistors is connected in series with at least one fuse. This at least one fuse ensures that no short-circuit occurs between the collecting lines, even if all varistors become permanently low-ohmic. Due to their comparatively slow reaction, fuses, however, do not hinder the elimination of lightning-induced overvoltages from the collecting lines to the potential equalization busbar of the current collecting device and thus towards ground during a lightning event.

The two collecting lines of each pair of collecting lines leading the DC current may each be connected to an intermediate point via a varistor, wherein the at least one fuse is connected in series with at least one of these varistors, and wherein the intermediate point is connected to the potential equalization busbar of the current collecting device via at least one further varistor. In this Y-connection of the varistors, there are at least two varistors connected in series for any occurring voltage. The voltages occurring in normal operation are thus at least distributed over two varistors, which allows the use of varistors of smaller dimension and thus of smaller varistors which are available at lower cost.

For the purpose of not permanently connecting any of the direct current leading lines with the potential equalization busbar of the current collecting device even if all varistors became low-ohmic due to an overload, at least one fuse connected in series with one of the varistors may be provided between each of the collecting lines and the further potential equalization busbar of the current collecting device.

It is to be understood that the way of fusing collecting lines for direct current from photovoltaic generators in a remote current collecting device with regard to lightnings, which has been described with a solar plant here, may also advantageously be applied independently of the inverter.

Now referring in greater detail to the drawings, the inverter 1 illustrated in FIG. 1 comprises two input lines 2 and 3, which are provided for connecting a DC power source not depicted here, and which lead to an input converter 4 of the inverter 1. Often, the input converter 4 is a DC/DC converter. Generally, it may also be a DC/AC converter which already outputs an output side AC voltage of the inverter 1. In any case, the converter 4 has an input voltage link 5 comprising a large buffer capacitance 6 which is effective between the input lines 2 and 3. This buffer capacitance is typically made of a plurality of individual capacitors, and it is not only of large capacitance but also able to accept high peak currents. In both input lines 2 and 3 an inductor 7 and 8, respectively, preferably an air-core inductor, is provided to prevent high frequency currents entering the inverter from the DC power source side, on the one hand, and to prevent the exit of such high frequency currents as they may be induced by lightnings out of the inverter 1. Between the inductors 7 and 8, which are generally optional in the inverter 1, and the voltage link 5 an overvoltage eliminator 10 is connected between the input line 2 and a grounded potential collection rail or potential equalization busbar 9. In one embodiment, this overvoltage eliminator 10 is a varistor of a type which, in a controlled way, becomes permanently low-ohmic upon being overloaded. On the other hand, a GFDI (Ground Fault Detector and Interrupter) 11 is connected between the other input line 3 and the potential equalization busbar 9 in series with an air-core inductor 12. The air-core inductor 12 avoids loading the GFDI 11 with high frequency currents or quick increases in current. The GFDI 11 serves for connecting the input line 3 with ground potential and, at the same time, for ground faults surveillance. The ground connection of the input line 3 to the potential equalization busbar 9 via the GFDI 11 is automatically interrupted by falling or tripping of the GFDI in case of an occurring ground fault. The GFDI signals its tripping, and the GFDI may be connected to a fault signaling device (not depicted here) which signals to the outside of the inverter. The potential equalization busbar 9 is connected to ground via a first local grounding device 13 and a second remote grounding device 14. The second remote grounding device 14 is connected to the potential collection rail 9 via a high voltage-isolated line 15, which has a length of about 20 m here, and which is a preferred flow path for lightning currents due to its low characteristic wave resistance for high frequency currents. Thus these lightning currents flow towards ground remote from the inverter 1, and, if this can not be avoided completely, couple into the input lines to a low extent, only. In case of an overvoltage present at the input line 2, like it may, for example, be caused by a lightning, this overvoltage flows as a current via the overvoltage eliminator 10 to the potential collection rail 9 and from there towards ground. In case that the varistor forming the overvoltage eliminator 10 has been overloaded by the occurring overvoltage and thus became permanently low-ohmic, tripping of the GFDI avoids a short-circuit between the two input lines 2 and 3 via the potential collection rail 9. Further, the fault signaling device of the GFDI may be used to indicate the occurrence of the overvoltage to the outside. If a lightning-induced overvoltage is present at the input line 3 it can be compensated by currents from the input line 2 due to the large buffer capacitance 6 of the voltage link 5 and because it is a high frequency event for which the buffer capacitance 6 has a low AC resistance. Resulting overvoltages at the input line 2 may flow via the overvoltage eliminator 10 and the potential collection rail 9 towards ground as already described. Also in this case, the GFDI 11 trips. A metallic housing 16 of the inverter 1 is also connected to the potential collection rail 9. So far as overvoltages occur at the housing, they are drained via the high voltage isolated connection line 15 and the second grounding device 14 without causing damage.

Figure 2:
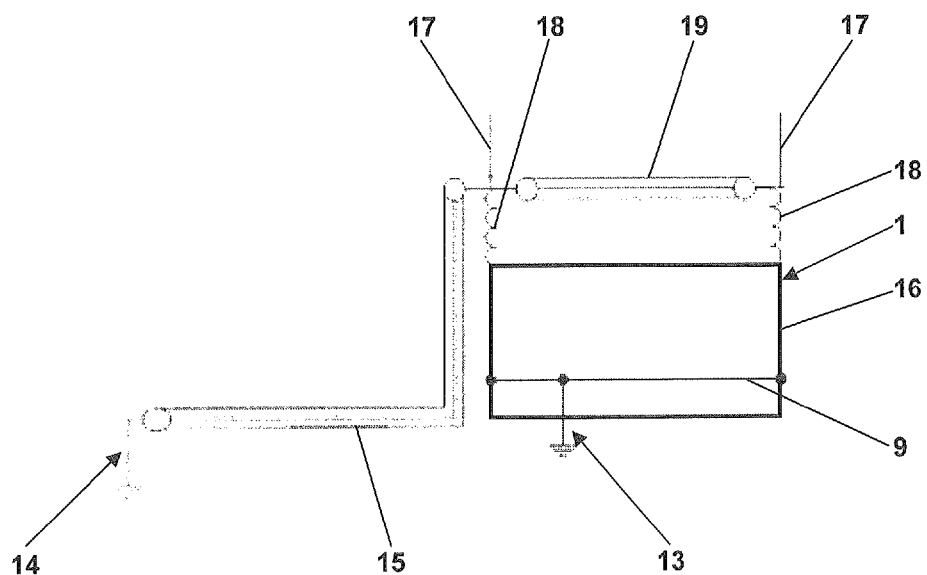
FIG. 2 illustrates an external lightning protection for the new inverter.

FIG. 2 illustrates a possibility to arrange additional lightning catching rods 17 above the housing 16 of the inverter 1 to drain occurring lightning currents. The lightning catching rods 17 are provided with high voltage isolations 18 with regard to the housing 16. They are connected to each other via a high voltage-isolated line 19 and to the second grounding device 14 via the high voltage-isolated connection line 15. This means, the connection line 15 is not connected to the potential equalization busbar 9 of the inverter 1 here. In this arrangement according to FIG. 2 most occurring lightning currents are already drained towards ground without coupling currents into the inverter 1.

Figure 3:
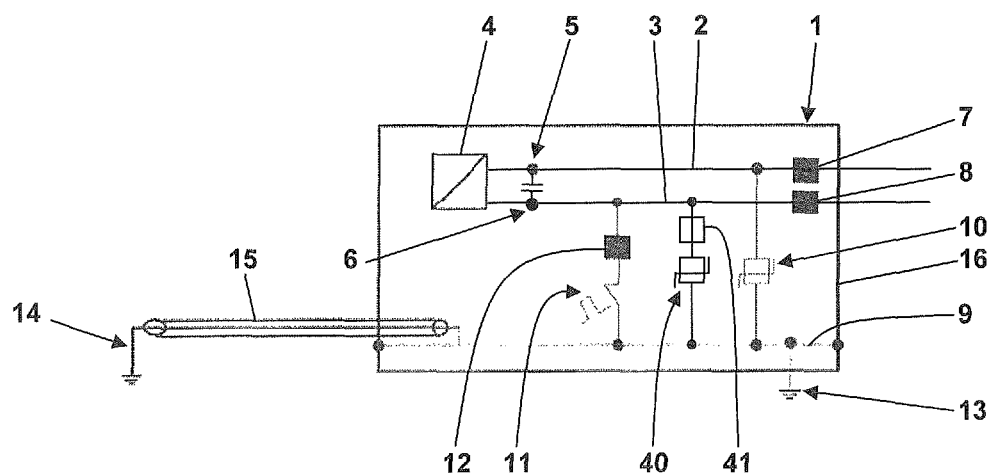
FIG. 3 illustrates a second embodiment of the new inverter.

In the embodiment of the inverter 1 depicted in FIG. 3, a further overvoltage eliminator 40 is provided between the input line 3 to which the GFDI 11 is connected and the potential equalization busbar 9, i.e. in parallel to the GFDI 11. The further overvoltage eliminator 40 is provided in addition to the overvoltage eliminator 10 between the input line 2 whose isolation with regard to the potential collection rail 9 is monitored by the GFDI. Like the overvoltage eliminator 10, the further overvoltage eliminator 40, in one embodiment, is a varistor of the type getting low-ohmic upon being overloaded, but may also be based on a spark gap. The further overvoltage eliminator 40 is connected in series with or fused by a fuse 41, which may be a lead fuse or a automatic current interrupter. Thus, the fuse 41, if the overvoltage eliminator 40 has been overloaded, prevents a high current from flowing through the overvoltage eliminator 40 which may be a short-circuit current between the two input lines 2 and 3 flowing via the potential equalization busbar 9 and the also overloaded and thus low-ohmic but not fused overvoltage eliminator 10. In normal operation, i.e. prior to any overload, the additional overvoltage eliminator 40 with the fuse 41 connected in series provides an additional flow path for overvoltages from the input line 3 to the potential equalization busbar 9.

Figure 4:
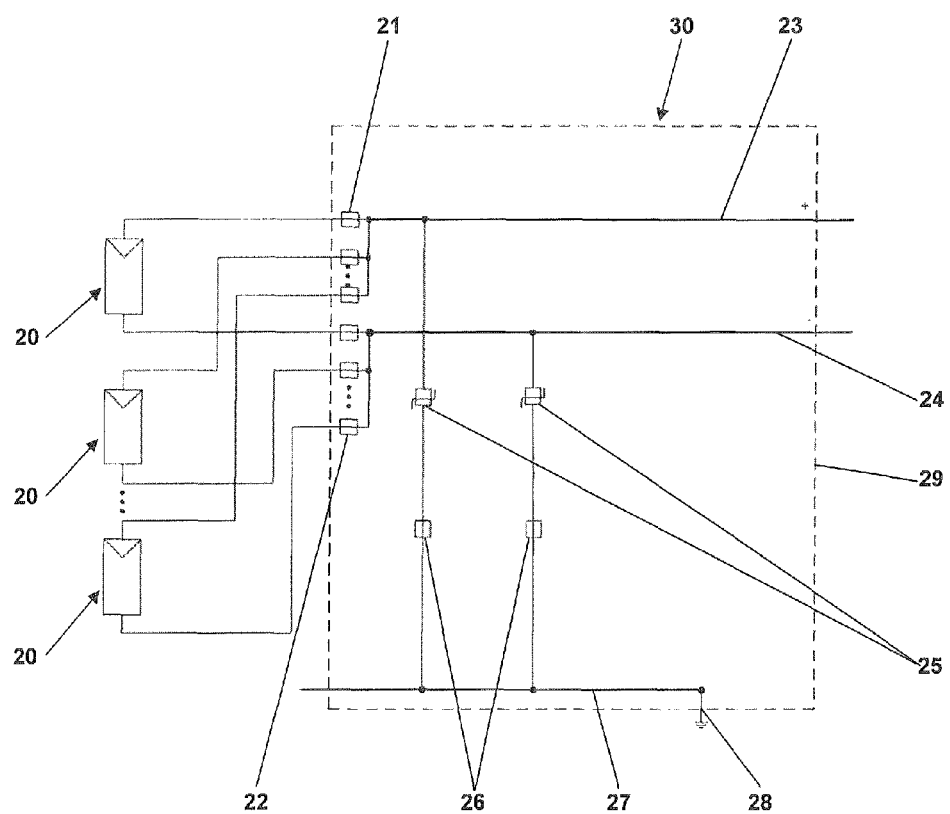
FIG. 4 illustrates an embodiment of an additional lightning protection provided in a current collection device remote from the inverter for a photovoltaic DC power source connected to the inverter.

FIG. 4 illustrates a plurality of photovoltaic generators 20 which together form a DC voltage source to be connected to the inverter 1 according to FIG. 1, 2 or 3. Each of these photovoltaic generators 20 may be a so-called string, i.e. connection of individual photovoltaic cells in series, and it may additionally comprise a plurality of such strings connected in parallel. Each photovoltaic generator is separately fused via a lead fuse 21 or 22, only one of these two lead fuses per photovoltaic generator being necessary. Via the lead fuses 21 and 22 the photovoltaic generators 20 are connected to lines 23 and 24 which serve as a collecting bus for current from the photovoltaic generators 20. Each line 23 and 24 is connected to a potential equalization busbar 27 connected to an grounding device 28 via a varistor of that type which, in a controlled way, becomes low-ohmic upon being overloaded as an overvoltage eliminator 25, and a fuse 26 in the form of a lead fuse or an automatic current interrupter connected in series with the overvoltage eliminator 25. Here, all parts surrounded by the dashed line 29 may be located in a housing of the current collecting device 30. The overvoltage eliminators 25 allow for overvoltages flowing from the lines 23 and 24 to the potential equalization busbar 27 and thus towards ground. The fuses 26 do not hinder this current flow. They do, however, trip upon the danger of an overload and at least upon the overvoltage eliminators 25 being overloaded and a resulting short-circuit between the lines 23 and 24, and terminate this short-circuit. If both fuses 26 trip, the ground connection of both lines 23 and 24 is interrupted. The fuses 26 may have a signalling contact which indicates externally that the overvoltage protection is no longer effective due to the tripped fuses 26.

Figure 5:
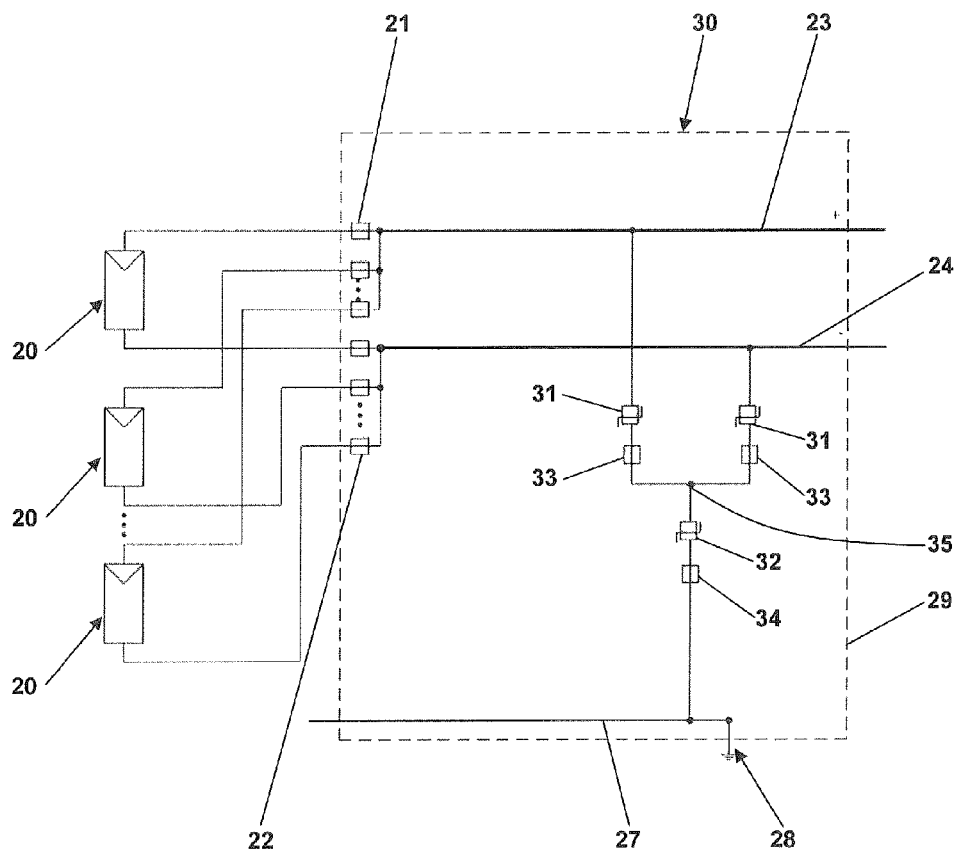
FIG. 5 illustrates another embodiment of an additional lightning protection provided in a current collection device remote from the inverter for a photovoltaic DC power source connected to the inverter.

According to FIG. 5, a total number of three overvoltage eliminators 31 and 32 with allocated fuses 33 and 34, i.e. with fuses 33 and 34 connected in series, are provided instead of two overvoltage eliminators 25 and two fuses 26. Here again, all overvoltage eliminators 31 and 32 may be varistors of that type which becomes low-ohmic upon being overloaded, and the fuses 33 and 34 may be lead fuses or automatic current interrupters. The overvoltage eliminators 31 are connected in series with the fuses 33 between the lines 23 and 24; and their centre point 35 is connected to the potential equalization busbar 27 via the overvoltage eliminator 32 and the fuse 34. Thus, two overvoltage eliminators 31, or 31 and 32 are present between all electrically relevant points. That is, any voltages occurring in normal operation is distributed over two overvoltage eliminators 31 and 32, here. Each overvoltage eliminator can thus be dimensioned smaller and correspondingly be built smaller as well as be made cheaper. Of the three fuses 33 and 34 shown in FIG. 5, the fuse 34 and/or one of the fuses 33 may be avoided without affecting the basic function of the lightning protection.

Many variations and modifications may be made to the preferred embodiments of the invention without departing substantially from the spirit and principles of the invention. All such modifications and variations are intended to be included herein within the scope of the present invention, as defined by the following claims.

The invention claimed is:

1. An inverter comprising:
   two input lines configured to connect the inverter to a DC power source;
   a buffer capacitance operably coupled between the two input lines;
   a potential equalization busbar configured to connect to at least one grounding device;
   an isolation monitoring device configured to monitor an electrical isolation of at least one of the two input lines with regard to the potential equalization busbar; and
   an overvoltage eliminating device configured to drain overvoltages from the two input lines to the potential equalization busbar, the overvoltage eliminating device comprising at least one overvoltage eliminator;
   wherein the at least one overvoltage eliminator of the overvoltage eliminating device is connected between at least one input line, whose electric isolation with regards to the potential equalization busbar is monitored by the isolation monitoring device, and the potential equalization busbar, without any fuse being connected in series with the at least one overvoltage eliminator.

2. The inverter of claim 1, wherein the isolation monitoring device comprises a ground fault detector and interrupter (GFDI), which is connected between the other of the two input lines and the potential equalization busbar and which is configured to selectively interrupt the connection between the other of the two input lines and the potential equalization busbar.

3. The inverter of claim 2, wherein the GFDI is connected in series with an inductor located between the other of the two input lines and the potential equalization busbar.

4. The inverter of claim 2, wherein the GFDI is operatively connected to a fault signaling device.

5. The inverter of claim 2, wherein an electric motor is provided for resetting the GFDI.

6. The inverter of claim 1, wherein the at least one overvoltage eliminator of the overvoltage eliminating device comprises only one overvoltage eliminator.

7. The inverter of claim 1, wherein each overvoltage eliminator of the overvoltage eliminating device comprises a varistor.

8. The inverter of claim 7, wherein each overvoltage eliminator of the overvoltage eliminating device comprises a varistor of a type that becomes permanently low-ohmic upon being overloaded.

9. The inverter of claim 1, wherein each overvoltage eliminator of the overvoltage eliminating device comprises a spark gap.

10. The inverter of claim 1, further comprising at least one inductor provided in each of the two input lines.

11. The inverter of claim 1, further comprising a metallic housing connected to the potential equalization busbar.

12. The inverter of claim 1, further comprising at least one high voltage-isolated connection line configured to connect the potential equalization busbar to at least one further grounding device.

13. The inverter of claim 1, further comprising at least one lightning catching rod, and at least one high voltage-isolated connection line configured to connect the at least one lightning catching rod to at least one further grounding device.

14. The inverter of claim 13, wherein the high voltage-isolated connection line has a length in a range of 10 m to 30 m.

15. The inverter of claim 1, wherein the overvoltage eliminating device further comprises another overvoltage eliminator connected in series with a fuse between the other of the two input lines and the potential equalization busbar.

16. The inverter of claim 1, wherein the potential equalization busbar comprises a conductive material having a first node connected to the first input line, a second node connected to the second input line, and at least one node connected to a ground terminal.

17. The inverter of claim 1, wherein the buffer capacitance comprises a first terminal connected to the first input line and a second terminal connected to the second input line.

18. A solar plant including:
   a plurality of photovoltaic generators configured to generate DC current;
   at least one inverter, the inverter comprising:
      two input lines configured to receive DC current from the plurality of photovoltaic generators;
      a buffer capacitance operably coupled between the two input lines;
      a grounded first potential equalization busbar;
      an isolation monitoring device configured to monitor the electrical isolation of at least one of the two input lines with regards to the potential equalization busbar; and
      an overvoltage eliminating device configured to drain overvoltages from the two input lines to the potential equalization busbar, the overvoltage eliminating device comprising at least one overvoltage eliminator;
      wherein the at least one overvoltage eliminator of the overvoltage eliminating device is connected between the at least one input line, whose electric isolation with regard to the potential equalization busbar is monitored by the isolation monitoring device, and the potential equalization busbar, without any fuse being connected in series with the at least one overvoltage eliminator; and at least one collecting device remote from the inverter configured to collect DC current from at least some of the plurality of photovoltaic generators and forward the DC current to the two input lines of the at least one inverter, the at least one collecting device comprising:

at least one pair of collecting lines configured to collect DC current from at least one of the plurality of photovoltaic generators;

a grounded second potential equalization busbar;

at least two varistors of a type which becomes permanently low-ohmic upon being overloaded per pair of collecting lines; and at least one fuse per pair of collecting lines;

wherein each collecting line of the at least one pair of collecting lines is connected to the second potential equalization busbar via at least one of the at least two varistors, and wherein at least one of the at least two varistors is connected in series with the at least one fuse.

19. The solar plant of claim 18, wherein the two collecting lines of the at least one pair of collecting lines are each connected to a common intermediate point via at least one of the at least two varistors, wherein at least one of the two varistors is connected in series with the at least one fuse, and wherein the intermediate point is connected to the second potential equalization busbar via a further one of the at least two varistors.

20. The solar plant of claim 18, wherein at least one fuse is connected in series with one of the varistors between each of the two collecting lines of the at least one pair of collecting lines and the second potential equalization busbar.

21. The solar plant of claim 18, wherein the overvoltage eliminating device further comprises another overvoltage eliminator, in series with a fuse, connected between the other of the two input lines and the potential equalization busbar.

* * * * *